(12) United States Patent
Bond et al.

(10) Patent No.: US 7,650,863 B2
(45) Date of Patent: Jan. 26, 2010

(54) VARIABLE ENGINE VALVE ACTUATION SYSTEM HAVING COMMON RAIL

(75) Inventors: Michael S. Bond, Chillicothe, IL (US);
Steven J. Funke, Mapleton, IL (US);
Michael P. Harmon, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 374 days.

(21) Appl. No.: 11/606,176

(22) Filed: Nov. 30, 2006

(65) Prior Publication Data

US 2008/0127920 A1 Jun. 5, 2008

(51) Int. Cl.
*F01L 1/18* (2006.01)

(52) U.S. Cl. .................. 123/90.44; 123/90.12; 74/569

(58) Field of Classification Search .............. 123/90.12, 123/90.13, 90.39, 90.44; 74/559, 567, 569
See application file for complete search history.

(56) References Cited

U.S. PATENT DOCUMENTS

| | | | |
|---|---|---|---|
| 5,127,375 A | | 7/1992 | Bowman et al. |
| 5,537,976 A | | 7/1996 | Hu |
| 5,622,144 A | | 4/1997 | Nakamura et al. |
| 5,680,841 A | | 10/1997 | Hu |
| 5,697,341 A | * | 12/1997 | Ausman et al. ............. 123/446 |
| 5,746,175 A | | 5/1998 | Hu |
| 5,857,438 A | | 1/1999 | Barnard |
| 5,996,550 A | * | 12/1999 | Israel et al. .................. 123/322 |
| 6,116,207 A | * | 9/2000 | Firey ........................... 123/250 |
| 6,125,585 A | | 10/2000 | Koneval et al. |
| 6,125,828 A | | 10/2000 | Hu |
| 6,244,257 B1 | | 6/2001 | Hu |
| 6,321,701 B1 | | 11/2001 | Vorih et al. |
| 6,494,173 B2 | | 12/2002 | Takahashi et al. |
| 6,520,131 B2 | | 2/2003 | Takahashi et al. |
| 6,722,349 B2 | * | 4/2004 | Leman et al. ........... 123/568.14 |
| 6,729,126 B2 | | 5/2004 | Ogiso et al. |
| 6,769,405 B2 | | 8/2004 | Leman et al. |
| 6,826,905 B2 | | 12/2004 | Gui et al. |

(Continued)

FOREIGN PATENT DOCUMENTS

AT 5779 U1 11/2002

(Continued)

OTHER PUBLICATIONS

PCT International Search Report; Applicant's Ref. No. 06-490; PCT/US2007/023194, Filing Date: Nov. 2, 2007; Applicant: Caterpillar Inc.

*Primary Examiner*—Ching Chang
(74) *Attorney, Agent, or Firm*—Finnegan, Henderson, Farabow, Garrett & Dunner

(57) ABSTRACT

A valve actuation system for a combustion engine is provided. The valve actuation system may have an engine valve movable between first and second spaced apart end positions. The valve actuation system may also have a first cam element mechanically coupled to move the engine valve, and a first hydraulic slave piston operatively connected to the engine valve to move the engine valve independent of movement of the first cam element. The valve actuation system may further have a high pressure rail fluidly connected to the first hydraulic piston, and a control valve disposed between the high pressure rail and the first hydraulic piston to regulate movement of the engine valve.

20 Claims, 2 Drawing Sheets

U.S. PATENT DOCUMENTS

| | | |
|---|---|---|
| 6,883,492 B2 | 4/2005 | Vanderpoel et al. |
| 6,895,912 B2 | 5/2005 | Saruwatari et al. |
| 6,904,892 B1 | 6/2005 | Afjeh et al. |
| 6,918,384 B2 | 7/2005 | Jehlik et al. |
| 7,059,282 B2 | 6/2006 | Vorih et al. |
| 7,073,470 B2 | 7/2006 | Horiuchi et al. |
| 7,079,935 B2 | 7/2006 | Lewis et al. |
| 2003/0145838 A1 | 8/2003 | Leman et al. |
| 2004/0020467 A1 | 2/2004 | Leman et al. |
| 2004/0083994 A1 | 5/2004 | Afjeh et al. |
| 2005/0126522 A1 | 6/2005 | Ruggiero |

FOREIGN PATENT DOCUMENTS

| | | |
|---|---|---|
| EP | 1041263 A2 | 4/2000 |
| EP | 1508676 A2 | 2/2005 |
| WO | WO 99/23378 | 5/1999 |
| WO | WO 2005/079491 | 9/2005 |

* cited by examiner

VARIABLE ENGINE VALVE ACTUATION SYSTEM HAVING COMMON RAIL

TECHNICAL FIELD

The present disclosure is directed to a valve actuation system and, more particularly, to a variable valve actuation system having a common rail.

BACKGROUND

The operation of an internal combustion engine such as, for example, a diesel, gasoline, or gaseous-fuel powered engine, may cause the generation of undesirable emissions. These emissions, which may include particulates and oxides of nitrogen (NOx), are generated when fuel is combusted in a combustion chamber of the engine. An exhaust stroke of the engine piston forces exhaust gas, which may include these emissions, from the engine. If no emission reduction measures are in place, these undesirable emissions will eventually be exhausted to the environment.

Research is currently being directed towards decreasing the amount of undesirable emissions that are exhausted to the environment during the operation of the engine. It is expected that improved engine design and improved control over engine operation may lead to a reduction in the generation of undesirable emissions. Many different approaches such as, for example, exhaust gas recirculation (EGR), water injection, and fuel injection timings, have been found to reduce the amount of emissions generated during the operation of the engine. Aftertreatment solutions such as, for example, traps and catalysts, have also been found to effectively remove emissions from an exhaust flow. However, because some of these solutions require increased exhaust temperatures, their efficient implementation sometimes requires non-typical engine valve events.

The engine valves in an internal combustion engine are typically driven by a cam arrangement that is operatively connected to a crankshaft of the engine. The rotation of the crankshaft results in a corresponding rotation of a cam that cyclically drives one or more cam followers. The movement of the cam followers results in the actuation of the engine valves, and the shape of the cam governs the timing and duration of the valve actuation. In order to produce a non-typical engine valve event, a variable valve actuation device that interrupts the cyclical movement of the valves is required.

One type of variable valve actuation device includes a hydraulic master/slave piston combination, as described in U.S. Pat. No. 6,125,585 (the '585 patent) issued to Hu on Oct. 3, 2000. Specifically, the '585 patent describes an internal combustion engine having an exhaust valve connected to a lobed cam by way of hydraulic linkage. As the lobed cam rotates, a master piston is displaced within a cylinder to pressurize fluid in the linkage. As the fluid is pressurized, a slave piston connected to the exhaust valve is displaced from an associated cylinder to reciprocatingly move the exhaust valve in accordance with cam rotation. To vary the actuating motion of the exhaust valve (i.e., lose valve lift by delaying valve opening or completely eliminate valve lift), some amount of the pressurized fluid is spilled from the linkage before pressurizing begins, thereby effectively shortening the linkage length. By selectively changing the exhaust valve's opening profile, exhaust treatment solutions such as EGR can be implemented.

Although the variable valve actuation device of the '585 patent may be effectively used to recirculate exhaust gas and, thereby, reduce an engine's emissions, it may be limited. In particular, the motion of the exhaust valve, as described in the '585 patent, is directly connected to motion of the lobed cam and, thus, the exhaust valve can only open, close, and/or have a maximum lift that corresponds with the rotational timing of the cam and the cam lobe profile. There may be situations where valve opening is desired but the cam lobe is not in a position to contact the master piston. In these situations, the device of the '585 patent would provide no assistance.

The valve actuation system and method of the present disclosure solve one or more of the problems set forth above.

SUMMARY OF THE DISCLOSURE

In one aspect, the present disclosure is directed to a valve actuation system for a combustion engine. The valve actuation system may include an engine valve movable between first and second spaced apart end positions. The valve actuation system may also include a first cam element mechanically coupled to move the engine valve, and a first hydraulic slave piston operatively connected to the engine valve to move the engine valve independent of movement of the first cam element. The valve actuation system may further include a high pressure rail fluidly connected to the first hydraulic piston, and a control valve disposed between the high pressure rail and the first hydraulic piston to regulate movement of the engine valve.

In another aspect, the present disclosure is directed to a method of actuating an engine valve. The method may include moving an engine valve between a first and second spaced apart end positions in a cyclical pattern. The method may also include pressurizing a supply of hydraulic fluid independent of the cyclical pattern. The method may further include selectively using the pressurized hydraulic fluid to interrupt the cyclical pattern.

DETAILED DESCRIPTION

Figure 1:
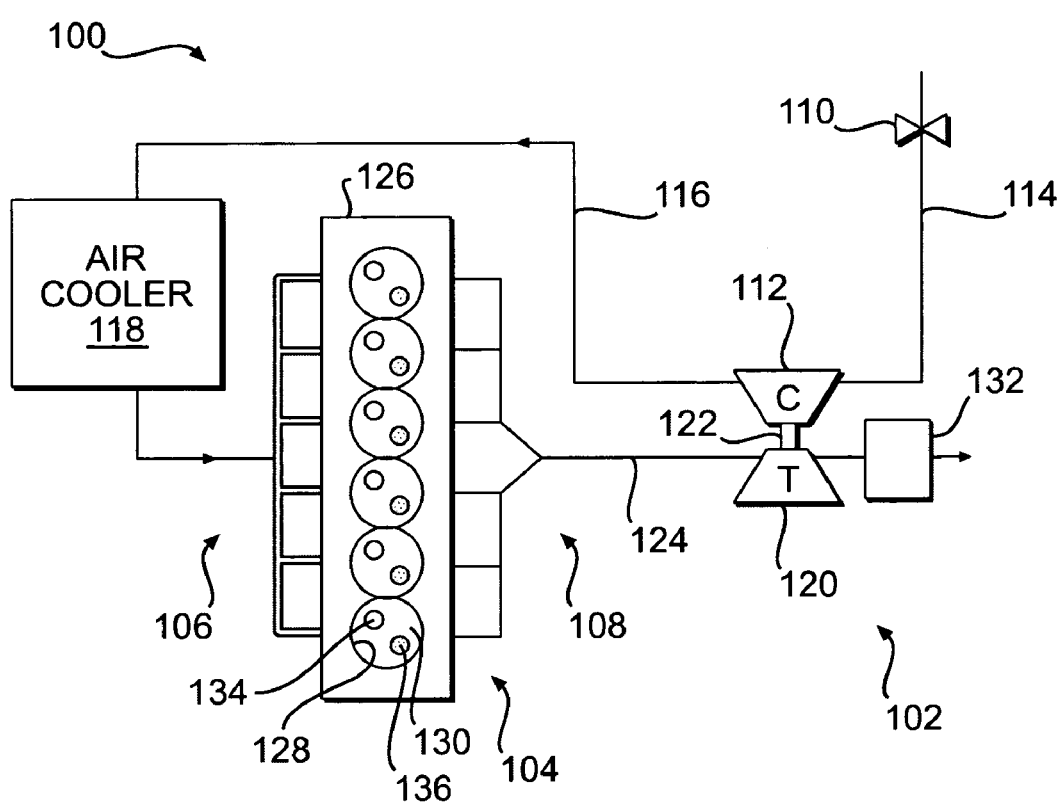
FIG. 1 is a schematic illustration of an exemplary disclosed power system.

FIG. 1 illustrates a power system 100 having a fluid handling system 102 configured to direct compressed air to, and exhaust gases from, a power source 104. Fluid handling system 102 may include an air induction system 106 and an exhaust system 108. It is contemplated that fluid handling system 102 may include additional subsystems such as, for example, an exhaust aftertreatment system, an external exhaust gas recirculation system, and other systems known in the art.

Air induction system 106 may include components configured to introduce charged air into power source 104. For example, air induction system 106 may include an induction valve 110, at least one compressor 112, and an air cooler 118. It is contemplated that additional components may be included within air induction system 106 such as, for example, additional valving, one or more air cleaners, one or more waste gates, a control system, and other means for introducing charged air into power source 104. It is also contemplated that power source 104 may alternatively be naturally aspirated rather than turbocharged, if desired.

As illustrated in FIG. 1, induction valve 110 may be fluidly connected to compressor 112 via a fluid passageway 114 to regulate the flow of atmospheric air to power source 104. Induction valve 110 may embody a shutter valve, a butterfly valve, a diaphragm valve, a gate valve, or any other type of valve known in the art. Induction valve 110 may be solenoid-actuated, hydraulically-actuated, pneumatically-actuated, or actuated in any other manner in response to one or more predetermined conditions.

Compressor 112 may be fluidly connected to power source 104 via a fluid passageway 116 to compress the air flowing into power source 104 to a predetermined pressure level. If more than one compressor is included within air induction system 106, they may be disposed in a series or parallel relationship and fluidly connected to fluid passageway 116. Compressor 112 may embody a fixed geometry compressor, a variable geometry compressor, or any other type of compressor known in the art. It is contemplated that compressed air may be diverted from fluid passageway 116 for other uses, if desired.

Air cooler 118, if used, may be disposed in fluid communication with fluid passageway 116, between compressor 112 and power source 104. Air cooler 118 may embody an air-to-air heat exchanger, an air-to-liquid heat exchanger, or a combination of both, and may facilitate the transfer of thermal energy to or from the air directed into power source 104. For example, air cooler 118 may include a shell and tube-type heat exchanger, a corrugated plate-type heat exchanger, a tube and fin-type heat exchanger, or any other type of heat exchanger known in the art. Air cooler 118 may thereby direct cooled, compressed air to power source 104.

For the purposes of this disclosure, power source 104 is depicted and described as a four-stroke diesel engine. One skilled in the art will recognize, however, that power source 104 may be any other type of internal combustion engine such as, for example, a gasoline or a gaseous fuel-powered engine. Power source 104 may include an engine block 126 that defines a plurality of combustion chambers. In the illustrated embodiment of FIG. 1, power source 104 includes six combustion chambers. However, it is contemplated that power source 104 may include a greater or lesser number of combustion chambers and that the combustion chambers may be disposed in an "in-line" configuration, a "V" configuration, or in any other suitable configuration.

Each combustion chamber may include a cylinder 128, a piston (not shown) and a cylinder head 130. Each piston may be slidably disposed within each cylinder 128 so as to reciprocate between a top-dead-center position and a bottom-dead-center position through an intake stroke, a compression stroke, a combustion or power stroke, and an exhaust stroke.

Power source 104 may also include a crankshaft (not shown) that is rotatably disposed within engine block 126. A connecting rod (not shown) may connect each piston to the crankshaft so that a reciprocating, sliding motion of each piston results in a rotation of the crankshaft. Similarly, a rotation of the crankshaft may result in a sliding motion of each piston between the top-dead-center and bottom-dead-center positions. Rotation of the crankshaft may also drive a valve cam for directing air to, and exhaust gases from, each combustion chamber.

As illustrated in FIG. 1, each cylinder head 130 may define an intake opening 134 and an exhaust opening 136. An intake passageway of air induction system 106 may permit entry of compressed air through an intake opening 134 of each cylinder head 130 and into the associated combustion chamber. Similarly, an exhaust opening 136 of each associated cylinder head 130 may release exhaust gases away from each combustion cylinder to an exhaust passageway 124 of exhaust system 108. In a further embodiment, each intake opening 134 and each exhaust opening 136 may include a pair of openings.

Exhaust system 108 may direct exhaust flow out of power source 104 via exhaust passageway 124. For this purpose, exhaust system 108 may include at least one turbine 120 connected in a series or parallel relationship along exhaust passageway 124. As illustrated in FIG. 1, turbine 120 may be connected to compressor 112 of air induction system 106 by way of a common shaft 122 to drive the connected compressor 112. In particular, as the hot exhaust gases exiting power source 104 move through exhaust passageway 124 to turbine 120 and expand against the blades (not shown) of turbine 120, turbine 120 may rotate and drive the connected compressor 112 via common shaft 122. It is also contemplated that turbine 120 may be omitted and compressor 112 driven by power source 104 mechanically, hydraulically, electrically, or in any other manner known in the art, if desired.

It is further contemplated that exhaust system 108 may include at least one aftertreatment device 132 in fluid communication with exhaust passageway 124. Aftertreatment device 132 may include any exhaust treatment device that is known in the art such as, for example, a particulate trap, NOx absorber or other catalytic device, attenuation device, and other means for directing exhaust flow out of power source 104.

Figure 2:
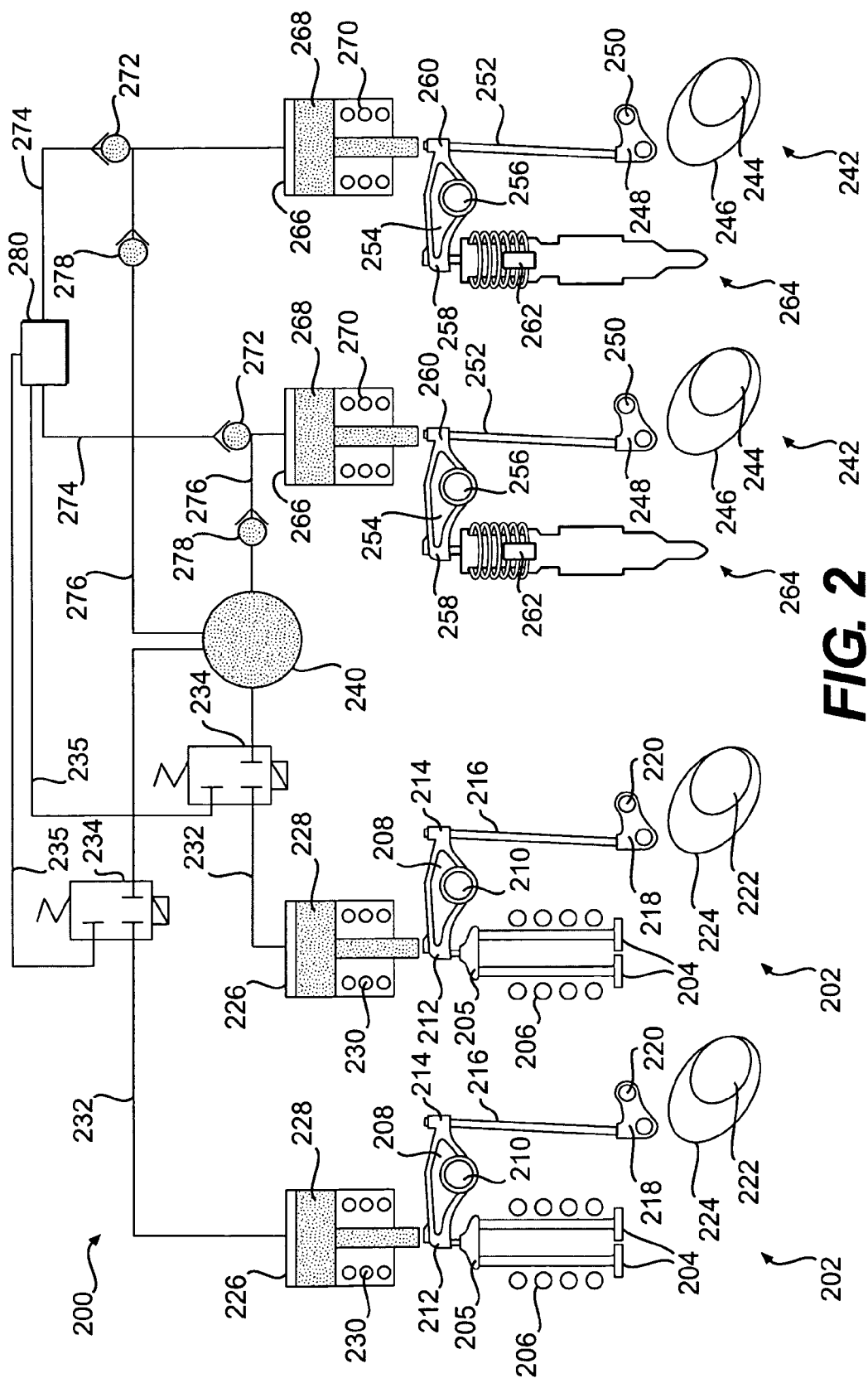
FIG. 2 is a schematic and diagrammatic illustration of an exemplary disclosed engine valve actuation system for use with the power system of FIG. 1.

Referring now to FIG. 2, a variable valve actuation system 200 may be operatively engaged with power source 104 and configured to move combustion chamber valve elements of power source 104 between first and second positions. Variable valve actuation system 200 may include at least one variable valve assembly 202 and at least one pressurizing piston assembly 242. Variable valve actuation system 200 may also include a high pressure common rail 240 and a low pressure hydraulic fluid reservoir 280, both being in fluid communication with the at least one variable valve assembly 202 and the at least one pressurizing piston assembly 242. Hydraulic fluid reservoir 280 may store a low pressure supply of hydraulic fluid such as, for example, engine oil, dedicated hydraulic fluid, gasoline, diesel fuel or any other known hydraulic fluid. In one embodiment, hydraulic fluid reservoir 280 may be a common supply of hydraulic fluid utilized for multiple purposes. Specifically, fluid reservoir 280 may store a supply of diesel fuel which may be used both as an actuating fluid for variable valve actuation system 200 and as combustion fuel for power source 104.

Variable valve assembly 202 may include engine valves 204 which may be biased by a return spring 206. In particular, return spring 206 may bias engine valves 204 toward a first position, where engine valves 204 engage respective seats in a corresponding cylinder head 130 to prevent a flow of fluid relative to the intake and/or exhaust openings 134, 136 of the cylinder head 130. Additionally, engine valves 204 may be movable toward a second position at which they are removed from their seats to allow a flow of fluid relative to intake and/or exhaust openings 134, 136 of the associated cylinder head 130. For example, engine valves 204 may be a pair of intake and/or exhaust valves disposed within intake openings 134 and/or exhaust openings 136 in the cylinder heads of power source 104.

As illustrated in FIG. 2, engine valves 204 may be mechanically coupled to move in accordance with a rotation of a valve cam 222 of power system 100. In particular, variable valve assembly 202 may be configured such that a rotation of a valve cam 222 effects a cyclical opening and closing of engine valves 204 as they move between the first and second spaced apart end positions. Valve cam 222 may be operatively engaged with the crankshaft of power source 104 in any manner readily apparent to one skilled in the art where a rotation of the crankshaft will result in a corresponding rotation of valve cam 222. For example, valve cam 222 may be connected to the crankshaft through a gear train (not shown) that reduces the rotational speed of valve cam 222 to approximately one half of the rotational speed of the crankshaft. As illustrated in FIG. 2, valve cam 222 may include a cam lobe 224. As will be explained in greater detail below, the shape of cam lobe 224 may determine, at least in part, the actuation timing and lift of engine valves 204 during a first operation of power source 104.

According to one embodiment, variable valve assembly 202 may include a cam follower 218 which rotates about a pivot 220 and may be adapted to follow the profile of the cam lobe 224 as valve cam 222 rotates. Cam follower 218 may be coupled to a rocker arm 208 by a push rod 216. Rocker arm 208 may include a first end 212, a second end 214, and a pivot point 210. First end 212 of rocker arm 208 may be operatively engaged with engine valves 204 through a bridge 205 connected between valves 204, while second end 214 of rocker arm 208 may be operatively engaged with cam follower 218 via push rod 216. Furthermore, contemplated push rods 216 and cam followers 218 may one or both be omitted such that valve cam 222 may more directly drive the pivoting of rocker arm 208, if desired.

Accordingly, as cam 222 rotates, the profile of cam lobe 224 may cause cam follower 218 to rise and lower, thereby producing a pivoting motion of rocker arm 208 about pivot point 210 via translation of push rod 216. Because rocker arm 208 may be configured to act upon valves 204 via first end 212 and bridge 205, the rotation of cam 222 may cause engine valves 204 to move between the first and second spaced apart end positions to create a lift pattern associated with cam lobe 224. In particular, a clockwise rotation of rocker arm 208 about pivot 210 may result in a closing of engine valves 204 whereas a counter-clockwise rotation of rocker arm 208 may result in an opening of engine valves 204.

Variable valve assembly 202 may also include a hydraulic cylinder 226 having a slave piston 228 configured to selectively engage first end 212 of rocker arm 208. Slave piston 228 may be biased by compression spring 230 in an upwards direction such that slave piston 228 may generally avoid contact with rocker arm 208. Moreover, because cam follower 218 may not be positively coupled to valve cam 222, slave piston 228 may act upon engine valves 204, through first end 212 of rocker arm 208, independent from the rotation of valve cam 222. Hydraulic cylinder 226 may be in fluid communication with common rail 240 via a fluid passageway 232. A control valve 234 may be disposed between hydraulic cylinder 226 and common rail 240 in communication with fluid passageway 232 to regulate a flow of hydraulic fluid therein. Accordingly, control valve 234 may actuate engine valves 204 via slave piston 228 by selectively metering pressurized hydraulic fluid in fluid passageway 232. Control valve 234 may also be in fluid communication with fluid supply 280 via fluid passageway 235 such that excess hydraulic fluid may drain to fluid supply 280 as biased by compression spring 230. The amount of fluid metered by control valve 234 may relate to a distance that the valves are moved by slave piston 228 away from the seats, while the flow rate of the metering fluid to slave piston 228 may relate to the opening speed of the valves. Moreover, in order to prevent wear or permanent damage to engine valves 204 caused by excessive valve travel speeds, a hydraulic snubber may be incorporated into hydraulic cylinder 226. During the final interval of piston travel, the hydraulic snubber may force the hydraulic fluid through an alternative passageway having decreased area such that the closing of engine valves 204 is damped.

As illustrated in FIG. 2, pressurizing piston assembly 242 may be associated with an injector cam 244 having a cam lobe 246. Injector cam 244 may actuate a fuel injector 264 through a series of mechanical and/or hydraulic linkages. Pressurizing piston assembly 242 may be driven by a cam follower 248, which may rotate about a pivot 250 to follow a profile of cam lobe 246 as injector cam 244 rotates. Cam follower 248 may be coupled to a rocker arm 254 by a push rod 252. Rocker arm 254 may include a first end 258, a second end 260, and a pivot point 256. First end 258 of rocker arm 254 may be operatively engaged with a plunger 262 of fuel injector 264, whereas second end 260 of rocker arm 254 may be operatively engaged with cam follower 248 via push rod 252.

Accordingly, as injector cam 244 rotates, the profile of cam lobe 246 may cause cam follower 248 to rise and lower, thereby producing a pivoting motion of rocker arm 254 about pivot point 256 via translation of push rod 252. Because rocker arm 254 may act upon plunger 262 via the first end 258, the rotation of injector cam 244 may result in a cyclical actuation of fuel injector 264. In particular, as rocker arm 254 rotates counterclockwise, plunger 262 may be engaged by first end 258 of rocker arm 254 to effect a spray of fuel from fuel injector 264. As rocker arm 254 rotates clockwise, plunger 262 may be disengaged so as to cease a fuel spray.

Pressurizing piston assembly 242 may also include a hydraulic cylinder 266 having a pressurizing piston 268 which may be biased by piston spring 270 in a downwards direction (i.e., into contact with rocker arm 254). Pressurizing piston 268 may be disposed in contact with second end 260 of rocker arm 254 such that rotation of rocker arm 254 may effect a sliding reciprocation of pressurizing piston 268 within hydraulic cylinder 266. According to this implementation, as rocker arm 254 rotates about pivot 256 in response to cyclical translation of push rod 252, pressurizing piston 268 may be made to correspondingly extend and retract within cylinder 266. Hydraulic cylinder 266 may be in fluid communication with common rail 240 via a fluid passageway 276 having a check valve 278. Thus, a reciprocating motion of pressurizing piston 268 may have the effect of charging or pressurizing the hydraulic fluid in common rail 240 by the application of force across the fluid in passageway 276. Hydraulic cylinder 266 may further be in fluid communication with low pressure fluid reservoir 280 via a fluid passageway 274 having a check valve 272. Fluid reservoir 280 may thereby provide a supply of hydraulic fluid to variable valve actuation system 200 for engagement in and between hydraulic cylinder 268, common rail 240 and hydraulic cylinder 226.

According to the embodiment of FIG. 2, variable valve actuation system 200 may include two variable valve assemblies 202 and two pressurizing piston assemblies 242 (i.e., one master piston and one slave piston per combustion cylinder). Although the variable valve actuation system 200 of FIG. 2 is illustrated to include two variable valve assemblies and two corresponding pressurizing piston assemblies, system 200 may include any number of variable valve assemblies and pressurizing piston assemblies. According to one embodiment of the present disclosure, variable valve actuation system 200 may include a number of variable valve assemblies and a number of pressurizing piston assemblies that corresponds to the number of combustion chambers of the associated engine. Alternatively, variable valve actuation system 200 may have a number of variable valve assemblies equal to the number of combustion chambers but may have a lesser number of pressurizing piston assemblies. By this embodiment, variable valve actuation system 200 may have a variable valve assembly 202 for each cylinder head 130, which is configured to actuate all of the intake valves or all of the exhaust valves of the particular cylinder head. Moreover, although pressurizing piston assemblies 242 are illustrated as the mechanisms for pressurizing the hydraulic fluid in common rail 240, it is contemplated that one or more engine-driven pumps may be used in lieu of hydraulic cylinders 266 for the purpose of pressurizing common rail 240. It is also contemplated that a single variable valve assembly 202 could actuate the intake and/or exhaust valves associated with multiple cylinder heads, if desired.

INDUSTRIAL APPLICABILITY

The disclosed valve actuation system may be applicable to any power system where improved fuel efficiency, exhaust emissions, power output, and/or engine braking is desired. In particular, the disclosed system may improve fuel efficiency, exhaust emissions, power output, and/or engine braking by facilitating multiple selectively variable valve events within a single engine cycle. The operation of power system 100 will now be explained.

Atmospheric air may be drawn into air induction system 106 by compressor 112 via induction valve 110, where it may be pressurized to a predetermined level and cooled by air cooler 118 before entering combustion chambers of power source 104. Fuel may be mixed with the pressurized air before or after entering the combustion chambers. This fuel-air mixture may then be combusted by power source 104 to produce mechanical work and an exhaust flow containing gaseous compounds and solid particulate matter. The exhaust flow may be directed from power source 104 to a turbine 120 where the expansion of hot exhaust gases may cause turbine 120 to rotate, thereby rotating connected compressor 112 and compressing the inlet air. After exiting turbine 120, the exhaust gas flow may flow through an aftertreatment device 132 and be directed to the atmosphere.

The combustion of fuel and air within power source 104 may cause a rotation of a cam assembly including valve cams 222 and injection cams 242. The cam assembly may act through cam followers 218 and rocker arms 208 to move engine valves 204 away from their respective seats, thereby initiating a conventional valve event. The initiation of a conventional valve event may coincide with the downward movement of associated pistons to draw air and fuel into respective combustion chambers of power source 104. As valve cams 222 continue to rotate, return springs 230 may act to return engine valves 204 to the flow blocking position, thereby ending the valve event. The end of the conventional valve event may be timed to coincide with the movement of associated pistons to their bottom-dead-center positions at the end of the intake stroke. Similarly, exhaust valves may be moved to allow pistons to push exhaust gas out of their associated combustion chambers during a conventional exhaust stroke of the pistons from bottom-dead-center to top-dead-center.

In order to pressurize the hydraulic fluid in variable valve actuation system 200, rotation of injector cams 242 as effected by the cam assembly may be further utilized. As injector cams 242 rotate, their respective cam lobes 246 may engage cam followers 248 such that they rotate about pivot points 250. As cam followers 248 follow the profiles of cam lobes 246, they may reciprocate up and down at the location where they contact push rods 252. Push rods 252 may thereby translate accordingly to effect a rotation of rocker arms 254 about pivots 256 so as to actuate fuel injectors 264 through plungers 262. Moreover, push rods 252 may effect reciprocating translation of pressurizing pistons 268 within hydraulic cylinders 266. Specifically, push rods 252 may engage pressurizing pistons 268 against the force of opposing biasing springs 270 such that the pressurizing pistons 268 force hydraulic fluid in cylinders 266 into the fluid passageways fluidly connected thereto. The hydraulic fluid forced from cylinders 266 may apply a force across the hydraulic fluid in fluid passageways 276 through check valves 278 so as to pressurize the hydraulic fluid in common rail 240. The hydraulic fluid in common rail 240 may therefore be reliably pressurized as a result of cyclical injector cam actuation of hydraulic cylinders 266.

Increased exhaust temperature may be desired in order to improve the conversion efficiency of a Selective Catalytic Reduction (SCR) aftertreatment device or to increase the rate of regeneration of a diesel particulate filter (DPF). In the event that it is desired to increase the temperature of exhaust gases released from power source 104, such as by an internal exhaust gas recirculation event or other event that results in warming of aftertreatment device 132, the conventional operation of power source 104, as explained above, may be selectively interrupted by variable valve actuation system 200. Specifically, in response to a need for an increased temperature of exhaust from power source 104, pressurized hydraulic fluid from common rail 240 may be selectively metered by control valves 234 for non-conventional actuation of engine valves 204 via hydraulic slave pistons 226. Pressurized hydraulic fluid from common rail 240 may travel through fluid passageways 232, as allowed by control valves 234. Control valves 234 may effect an actuation of slave pistons 228 by the precisely timed release of pressurized hydraulic fluid. The pressurized hydraulic fluid may force slave pistons 228 against the opposing force of biasing springs 230 such that a downward, opening force is applied to engine valves 204 through their respective valve stems. Because cam followers 218 are not mechanically coupled to valve cams 222, actuation of engine valves 204 by slave pistons 228 may occur independent from the conventional valve event-induced valve cam rotation. At an end of the unconventional valve event, biasing springs 230 may return slave pistons 228 to their disengaged locations such that conventional oscillation of rocker arm 208 may proceed in response to the normal rotation of valve cams 222. The hydraulic variable valve actuation system 200 may thereby selectively interrupt the normal cyclical motion of engine valves 204.

Several advantages are associated with the disclosed variable valve actuation system. In particular, because one or more master pressurizing pistons 268 may be in fluid communication with the common rail, numerous different valve events may be possible at any time, including variable start and end timing, variable valve lift, valve lift profile, and other similar events that may be initiated and/or changed in response to various parameters. That is, the motion of the master piston may be disconnected from the slave pistons such that the slave pistons can be actuated as often as desired, regardless of the master piston motion so long sufficient pressurized fluid is present within common rail 240. Moreover, because high speed control valves 234 may actuate a precise application of hydraulic pressure to slave pistons 228, engine valve position may be closely controlled in response to a signaled demand for increased exhaust temperature. The valves may be particularly controlled to achieve sufficiently elevated exhaust temperatures even at low engine load. Thus, the use of multiple masters with a single common rail provides flexibility for the timing of non-conventional valve events.

For example, exhaust valves may be opened earlier than normal in order to create a higher temperature exhaust flow. Specifically, the exhaust valves may be selectively held open during a portion of an intake stroke such that some exhaust gases are drawn back into a combustion chamber. The recirculated exhaust gas may reduce the oxygen in the combustion chamber, resulting in a fuel/air atmosphere therein. This fuel/air atmosphere resulting from decreased oxygen gas, is commonly referred to as a "rich" atmosphere. When such a fuel/air mixture combusts, it does so at an elevated temperature, thereby increasing the temperature of the resulting exhaust. Alternatively, intake valves may be closed later than normal, thereby, pushing air out of the chamber so as to reduce the air to fuel ratio. Such a lowered ratio may similarly result in higher exhaust temperatures. Because both an intake valve and an exhaust valve may be movable with identical actuators, the cost of the power system employing the disclosed valve actuation system may be low.

Finally, it is an aspect of the present disclosure to limit valve lift (i.e., the distance between the first and second spaced apart end positions) during non-conventional valve events as compared to that during conventional valve events for the purpose of limiting pressure loss in common rail 240. In one embodiment, the maximum movement of engine valves 204, as initiated by slave pistons 228, may be less than half of the distance between the first and second spaced apart end positions. In a further embodiment, the maximum movement of engine valves 204, as initiated by slave pistons 228, may be about one quarter of the distance between the first and second spaced apart end positions. Assuming that typical valve lift is in the range of 12-15 mm, the maximum movement of engine valves 204, as initiated by slave pistons 228, may be about 3 mm. Such a reduced valve lift may, thereby, achieve the desired objectives of non-conventional valve events without resulting in the excessive release of pressurized hydraulic fluid from common rail 240. By minimizing the amount of fluid necessary for a non-conventional valve event, the total volume of fluid required by variable valve actuation system 200 may be reduced, and the energy expended to pressurize the fluid may be minimal.

It will be apparent to those skilled in the art that various modifications and variations can be made to the disclosed variable valve actuation system. Other embodiments will be apparent to those skilled in the art from consideration of the specification and practice of the disclosed variable valve actuation system. It is intended that the specification and examples be considered as exemplary only, with a true scope being indicated by the following claims and their equivalents.

What is claimed is:

1. A valve actuation system for a combustion engine, comprising:
    an engine valve movable between first and second spaced apart end positions;
    a first cam element mechanically coupled to move the engine valve;
    a first hydraulic slave piston operatively connected to the engine valve to move the engine valve independent of movement of the first cam element;
    a common rail fluidly connected to the first hydraulic slave piston;
    a second cam element;
    a pressurizing hydraulic piston movable by the second cam element to displace fluid to the common rail, thereby pressurizing the common rail; and
    a control valve disposed between the common rail and the first hydraulic slave piston to regulate movement of the engine valve.

2. The valve actuation system of claim 1, further including a source of fluid in communication with:
    the pressurizing hydraulic piston to supply pressurized fluid to the common rail; and
    the control valve to receive fuel not directed to the first hydraulic slave piston.

3. The valve actuation system of claim 1, further including:
    a second engine valve movable between first and second spaced apart end positions;
    a third cam element mechanically coupled to move the second engine valve; and
    a second hydraulic slave piston operatively coupled to move the second engine valve, wherein the second hydraulic slave piston is fluidly connected to the common rail.

4. The valve actuation system of claim 3, further including a second control valve disposed between the common rail and the second hydraulic slave piston to regulate movement of the second engine valve independent of the first engine valve.

5. The valve actuation system of claim 4, further including:
    a fourth cam element; and
    a second pressurizing hydraulic piston movable by the fourth cam element to displace fluid to the common rail, thereby pressurizing the common rail.

6. The valve actuation system of claim 5, wherein the number of pressurizing hydraulic pistons corresponds to the number of hydraulic slave pistons.

7. The valve actuation system of claim 1, wherein rotation of the second cam element results in injections of fuel into the combustion engine.

8. The valve actuation system of claim 1, wherein a maximum movement of the engine valve initiated by the first hydraulic slave piston is less than half of the distance between the first and second spaced apart end positions.

9. The valve actuation system of claim 8, wherein the maximum movement of the engine valve initiated by the first hydraulic slave piston is less than one quarter of the distance between the first and second spaced apart end positions.

10. The valve actuation system of claim 1, wherein:
    a distance between the first and second spaced apart end positions is in the range of 12-15 mm; and
    a maximum movement of the engine valve initiated by the first hydraulic slave piston is about 3 mm.

11. The valve actuation system of claim 1, further including a low pressure source of fluid in communication with the pressurizing hydraulic piston.

12. The valve actuation system of claim 1, wherein movement of the first hydraulic slave piston results in warming of an aftertreatment device.

13. An engine, comprising:
    a block at least partially defining a combustion chamber;
    a fuel injector associated with the combustion chamber;
    a fluid port in communication with the combustion chamber; and
    the valve actuation system as in claim 1 configured to affect fluid flow through the fluid port and operation of the fuel injector.

14. A method of actuating an engine valve of a combustion engine, the method comprising:
    moving an engine valve between first and second spaced apart end positions in a cyclical pattern;
    pressurizing a supply of hydraulic fluid independent of the cyclical pattern; and
    selectively using the pressurized hydraulic fluid to interrupt the cyclical pattern;
    wherein pressurizing includes pressurizing the supply of hydraulic fluid at a number of separate locations equal to a number of cylinders in the combustion engine.

15. The method of claim 14, wherein the cyclical pattern can be selectively interrupted at any time in the cyclical pattern.

16. The method of claim 14, wherein the hydraulic fluid is a combustion fuel.

17. The method of claim 14, wherein pressurizing is based on rotation of injector cams of the combustion engine.

18. The method of claim 14, wherein the cyclical pattern is selectively interrupted by selectively operating a valve in communication with the supply of hydraulic fluid.

19. The method of claim 14, wherein interrupting includes moving the engine valve away from the first end position by a distance limited to less than the full distance between the first and second positions.

20. The method of claim 19, wherein interrupting includes moving the engine valve away from the first end position by a distance limited to about a quarter of the full distance between the first and second positions.

* * * * *